United States Patent [19]

Filstrup

[11] 4,163,009

[45] Jul. 31, 1979

[54] METHOD OF SEPARATING ANIMAL RAW MATERIAL

[75] Inventor: Poul Filstrup, Virum, Denmark

[73] Assignee: Alfa-Laval AB, Tumba, Sweden

[21] Appl. No.: 871,828

[22] Filed: Jan. 24, 1978

[30] Foreign Application Priority Data

Jan. 27, 1977 [SE] Sweden .............................. 77008423

[51] Int. Cl.² ................................................ A23J 1/02
[52] U.S. Cl. ............................. 260/112 R; 260/412.6;
210/56; 210/71; 210/69; 210/96.1; 422/111
[58] Field of Search ................... 210/56, 69, 71, 96 R,
210/101; 260/412.5, 412.6, 412.8, 112 R;
23/253 A, 280; 196/132; 422/111

[56] References Cited

U.S. PATENT DOCUMENTS

| | | | |
|---|---|---|---|
| 2,328,361 | 8/1943 | Sanders | 210/56 |
| 3,020,160 | 2/1962 | Downing | 210/69 |
| 3,078,287 | 2/1963 | Downing | 260/112 R |
| 3,252,961 | 5/1966 | Rodgers | 260/112 R |
| 3,345,353 | 10/1967 | Klubien | 260/112 R |
| 3,346,393 | 10/1967 | Bradford | 260/412.6 |
| 3,352,841 | 11/1967 | Lyon | 260/412.6 |
| 3,443,691 | 5/1969 | Nilsson | 210/101 |
| 3,780,075 | 12/1973 | Dufault et al. | 260/412.6 |
| 3,798,126 | 3/1974 | Gasser | 260/112 R |
| 3,972,779 | 8/1976 | Harrison | 196/132 |

FOREIGN PATENT DOCUMENTS

2519701 11/1976 Fed. Rep. of Germany ........ 210/96 R
905547 6/1960 United Kingdom .................. 260/412.5

OTHER PUBLICATIONS

Chemical Engineer's Handbook, Perry, Fourth Edition, McGraw-Hill, 1969, pp. 22–39, 32, 33.

Primary Examiner—Charles N. Hart
Assistant Examiner—Ernest G. Therkorn
Attorney, Agent, or Firm—Cyrus S. Hapgood

[57] ABSTRACT

To separate animal raw material into fat and protein fractions, the material in finely divided form is circulated through a circuit which includes a heating zone where the material is continuously heated to a relatively low temperature of about 45°–70° C., and a stream of warm material from this circuit is then quickly heated to a higher temperature of about 85°–100° C. This quickly heated material is immediately subjected to centrifugal separation in one or more stages to provide the two fractions of fat and protein, respectively.

3 Claims, 1 Drawing Figure

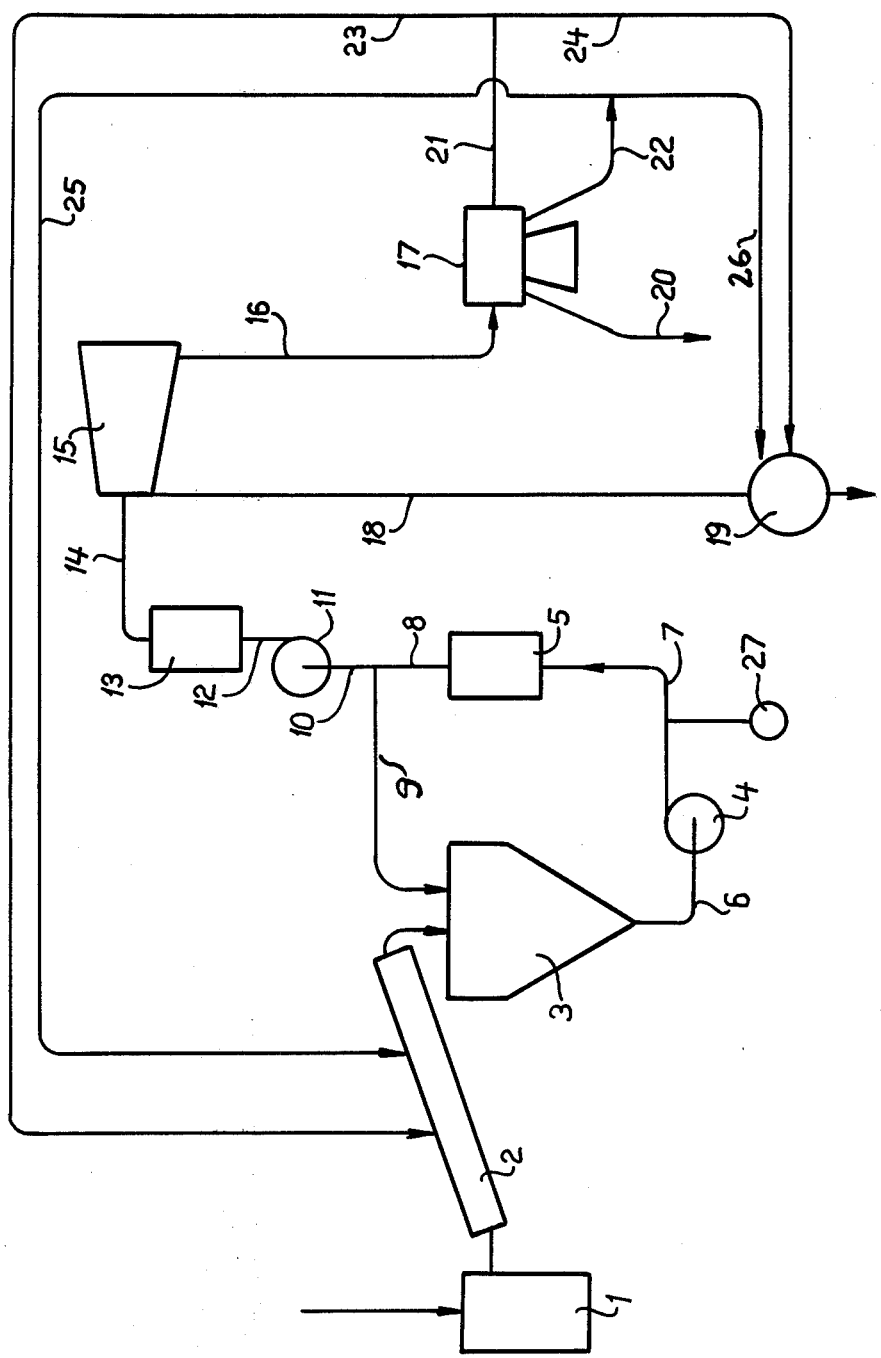

METHOD OF SEPARATING ANIMAL RAW MATERIAL

This invention relates to a method of separating animal raw material, such as slaughter-house offal, into one fat fraction and at least one protein fraction, which method comprises finely dividing the raw material (by grinding or the like), continuously heating the ground material to a relatively low first temperature, perhaps with the addition of water (preferably process water), heating a warm raw material flow quickly to a second, higher temperature, and immediately separating the flow into the desired fractions by centrifugal separation in one or more stages.

Such methods are known in a variety of embodiments. In one system for performing it, the raw material is ground and is then passed along a melting pipe into which live steam is injected, to make the raw material attain a pumpable consistency, and is further fed to a storage tank provided with a stirrer and a steam coil for heating. From the storage tank, a raw material flow is pumped through a heater in which the temperature is raised to such an extent that the subsequent separation in a centrifugal separator is facilitated. From the centrifugal separator, one fat fraction and one sludge fraction, rich in protein, emerge. The fat fraction is further purified by centrifugal separation, and the protein fraction may be processed, as for feed.

Such a system suffers from certain drawbacks. It is difficult to obtain a thorough heating through the raw material flow without too high a temperature in the melting pipe. Thus, if this temperature is too high, the collagene in the raw material may be converted into gelatine and be extracted, which means impaired conditions for separating the raw material into one fat fraction and one protein fraction, due to higher viscosity and the risk of forming an emulsion.

The utilization of the above-mentioned storage tank also means difficulties, as with respect to the uniformity of the raw material flow taken from the tank. Thus, it is very difficult to arrange the mixing in the tank in such a way that complete mixing is obtained without further emulsion formation. At the same time, it must be considered that a liquid has to be mixed into the finely divided raw material to enable the separation of same into the desired fractions. This liquid is generally process water which is returned from the separation stage of the system. It is necessary to mix this process water efficiently with the finely divided raw material. The consistency (i.e., the viscosity) of the raw material flow to be separated by centrifugal separation depends on the composition, especially the water content and the temperature. It has proved to be difficult to control this viscosity in prior systems of the type previously described.

An object of the present invention is to provide a method of the previously mentioned type which does not suffer from the drawbacks inherent in prior methods of this kind.

According to the invention, a method of the previously mentioned type is characterized in that the heating of the raw material to the first temperature is performed in a circuit.

By choosing an appropriate circulating rate, a thorough mixing is obtained without the risk of emulsion formation. Pumps which handle the circulating material in a gentle way should be used, such as pumps of the "MONOPUMP" type.

The heating is performed by a heater coupled in the circuit for live or indirect steam, whereby an efficient heating throughout the raw material flow is guaranteed without the risk of overheating.

In order to reduce the risk of emulsion formation during the heating in the circuit, the finely divided raw material is heated in the circuit to a first temperature of 45°–70° C. To facilitate the separation by centrifugal separation, the heated raw material flow coming from the circuit is heated to a second temperature of 85°–100° C.

According to a preferred embodiment of the new method, comprising addition of process water to the finely divided raw material, the viscosity is sensed in the raw material flow circulating in the circuit and is caused to control the feed rate of finely divided raw material to the circuit in such a way that the viscosity of the raw material flow is kept at a constant level. Such viscosity sensing may be performed by measurement of the pressure in the circuit at a constant circulating rate which is maintained by circulation pump of the displacement type. The feed rate is controlled through a controller which, for instance, may act on the feed rate to the apparatus (e.g., a mill) which is used for finely dividing the raw material. Since the temperature is kept at a constant level in the circuit, this means that even the viscosity of the raw material flow will remain constant after heating to the second, higher temperature prior to centrifugal separation, which contributes to an optimal result of the centrifugal separation.

The viscosity may also be influenced by the amount of liquid (preferably process water from the centrifugal separation) which is returned to the circuit. Even sludge from any further centrifugal separation of the fat fraction may be returned to the circuit for adjustment of the viscosity of the raw material flow.

Referring to the drawing, which is a schematic view of a system for practicing the method according to the invention, the system comprises a mill 1 for finely dividing the raw material, a conveyor 2 for transporting the finely divided raw material, and a circuit consisting of a tank 3 provided with a conical bottom, a pump 4 and a heater 5, these circuit parts being connected to each other by conduits 6, 7, 8 and 9. A conduit 10 leading from the circuit is connected via a pump 11 and a conduit 12 to a heater 13 for injection of live steam. The heater 13 is connected via a conduit 14 to a first centrifugal separator 15 provided with an outlet conduit 16 for a fat/water-mixture, which conduit is connected to a second centrifugal separator 17. A discharge conduit 18 for solids phase leads from the centrifugal separator 15 to a drier 19 for the solids phase. The centrifugal separator 17 is provided with three outlets, namely, an outlet 20 for fat, an outlet 21 for water phase, and a sludge phase outlet 22. The water phase may be returned to the circuit via a conduit 23 and/or to the drier 19 via a conduit 24. The sludge phase may be returned to the circuit via a conduit 25 or sent to the drier 19 via a conduit 26.

A manometer 27 is provided in the circuit 3–9 for measurement of the pressure in the conduit 7.

Raw material is fed into the mill 1 and is transported, finely divided, to the tank 3. The pump 4 operates with a capacity which is 6–12 times the raw material capacity of the plant, which means that the circulation rate in the circuit 3–9 will be high. The heater 5, which forms a heating zone in circuit 3–9, operates with either live or indirect steam. Live steam is injected into the heater 13 to make the temperature rise quickly to the desired value, whereupon the raw material flow is separated immediately in the centrifugal separator 15 into a solids phase flow, which is dried in the drier 19, and a fat/water flow also containing minor amounts of solids phase. The latter flow is divided by centrifuge 17 into fat, which leaves the system at 20, and water (with glue substances dissolved) and sludge. The two latter flows are returned to the circuit 3–9. Part of the water is sent to the drier 19 through conduit 24.

The feed rate to the system is controlled by reading the manometer 27, which may also be connected to a controller (not shown) for controlling the raw material feed automatically.

The system is illustrated further by the following example giving operational data: 1000 kgs/h of slaughter-house bones containing 15% of fat, 39% of water and 46% of another solid substance were fed to the system. 1400 kgs/h of water and 70 kgs/h of sludge were returned via the conduits 23 and 25; and 50 kgs/h of steam were put into the heater 5, whereby the temperature in the circuit reached 55°–60° C. 140 kgs/h of steam were additionally put into the heater 13. The temperature of the flow to the centrifugal separator 15 was 90°–95° C. From the centrifugal separator 15, a solids flow of 745 kgs/h was discharged at 18 while a fat/water flow of 1915 kgs/h was discharge at 16. The latter flow was separated in the centrifugal separator 17 into 121 kgs/h of fat, 70 kgs/h of sludge for returning and 1724 kgs/h of water, of which 324 kgs/h were sent to the drier 19 and 1400 kgs/h were returned. From the drier 19, 525 kgs/h of meat bone meal containing 5.5% of fat and 10.0% of water were discharged. Thus, it was possible to attain a desired low fat content in the meat bone meal.

I claim:

1. A method of separating animal raw material, such as slaughter-hour offal, into one fat fraction and at least one protein fraction, which comprises the steps of finely dividing the raw material, subjecting the finely divided raw material continuously to a first heating to heat it to a relatively low temperature of 45° to 70° C. and at constant viscosity, said first heating being effected by circulating the finely divided raw material through a circuit which includes a heating zone, and means to maintain constant viscosity quickly heating a flow of warm material from said first heating to a higher temperature of 85° to 100° C., immediately separating said quickly heated flow by centrifugal separation to provide said fat fraction and said protein fraction, and adding water to the material subjected to said first heating.

2. The method of claim 1, in which said added water is derived from said centrifugal separation.

3. The method of claim 1, which comprises also sensing the viscosity of the raw material circulating through said circuit, and maintaining the viscosity of the raw material flow in said circuit substantially constant by using said viscosity sensing to control the feed rate of finely divided raw material to the circuit.

* * * * *